United States Patent
Muller

(10) Patent No.: US 7,300,022 B2
(45) Date of Patent: Nov. 27, 2007

(54) MODIFIED MEMBRANES

(75) Inventor: Heinz-Joachim Muller, Thornleigh (AU)

(73) Assignee: Siemens Water Technologies Corp., Warrendale, PA (US)

( * ) Notice: Subject to any disclaimer, the term of this patent is extended or adjusted under 35 U.S.C. 154(b) by 0 days.

(21) Appl. No.: 10/903,950

(22) Filed: Jul. 30, 2004

(65) Prior Publication Data

US 2005/0029185 A1 Feb. 10, 2005

Related U.S. Application Data

(60) Division of application No. 10/437,202, filed on May 12, 2003, now Pat. No. 6,884,350, which is a continuation of application No. PCT/AU01/01450, filed on Nov. 9, 2001.

(30) Foreign Application Priority Data

Nov. 13, 2000 (AU) .................................. PR1434

(51) Int. Cl.
  B29C 65/00 (2006.01)
  B29C 67/20 (2006.01)
  B01D 39/0042 (2006.01)
(52) U.S. Cl. ................ 246/41; 264/48; 264/49; 210/500.42
(58) Field of Classification Search ............. 264/41, 264/48, 49; 210/500.37, 500.38, 500.35, 210/490, 500.23, 500.27, 500.42, 500.36; 94/4, 6; 428/36.5, 310.5, 500.23
See application file for complete search history.

(56) References Cited

U.S. PATENT DOCUMENTS

| | | | |
|---|---|---|---|
| 1,994,135 A | | 3/1935 | Horowitz |
| 3,625,827 A | * | 12/1971 | Wildi et al. ................ 435/175 |
| 3,693,406 A | | 9/1972 | Tobin |
| 3,763,055 A | * | 10/1973 | White et al. .................. 521/62 |
| 3,876,738 A | * | 4/1975 | Marinaccio et al. .......... 264/41 |
| 3,968,192 A | | 7/1976 | Hoffman et al. |
| 3,992,301 A | | 11/1976 | Shippey et al. |
| 4,076,656 A | * | 2/1978 | White et al. .................. 521/64 |
| 4,188,817 A | | 2/1980 | Steigelmann |
| 4,192,750 A | | 3/1980 | Elfes et al. |
| 4,193,780 A | | 3/1980 | Cotton, Jr. et al. |
| 4,203,848 A | * | 5/1980 | Grandine, II ................ 210/490 |
| 4,218,324 A | | 8/1980 | Hartmann et al. |
| 4,230,583 A | * | 10/1980 | Chiolle et al. ............... 210/490 |
| 4,248,648 A | | 2/1981 | Kopp |
| 4,302,336 A | * | 11/1981 | Kawaguchi et al. ......... 210/654 |
| 4,340,479 A | * | 7/1982 | Pall .............................. 210/490 |
| 4,353,802 A | * | 10/1982 | Hara et al. ................... 210/654 |
| 4,384,474 A | | 5/1983 | Kowalski |
| 4,385,150 A | | 5/1983 | Miyake et al. |
| 4,407,975 A | | 10/1983 | Yamaguchi ................... 521/27 |
| 4,451,369 A | | 5/1984 | Sekino et al. |
| 4,511,471 A | | 4/1985 | Muller |
| 4,540,490 A | | 9/1985 | Shibata et al. |
| 4,547,289 A | | 10/1985 | Okano et al. |
| 4,609,465 A | | 9/1986 | Miller |
| 4,614,109 A | | 9/1986 | Hofmann |
| 4,632,745 A | | 12/1986 | Giuffrida et al. |
| 4,636,296 A | | 1/1987 | Kunz |
| 4,642,182 A | | 2/1987 | Drori |
| 4,647,377 A | | 3/1987 | Miura |
| 4,650,586 A | | 3/1987 | Ellis, III |
| 4,656,865 A | | 4/1987 | Callan |
| 4,660,411 A | | 4/1987 | Reid |
| 4,670,145 A | | 6/1987 | Edwards |
| 4,673,507 A | | 6/1987 | Brown |
| 4,687,561 A | | 8/1987 | Kunz |
| 4,688,511 A | | 8/1987 | Gerlach et al. |
| 4,718,270 A | | 1/1988 | Storr |
| 4,744,240 A | | 5/1988 | Reichelt |
| 4,756,875 A | | 7/1988 | Tajima et al. |
| D763,612 | | 8/1988 | Iwanami |
| 4,767,539 A | | 8/1988 | Ford |
| 4,779,448 A | | 10/1988 | Gogins |
| 4,784,771 A | | 11/1988 | Wathen et al. |
| 4,793,932 A | | 12/1988 | Ford et al. |
| 4,797,187 A | * | 1/1989 | Davis et al. ................... 427/58 |
| 4,797,211 A | | 1/1989 | Ehrfeld et al. |
| 4,810,384 A | | 3/1989 | Fabre |
| 4,812,235 A | | 3/1989 | Seleman et al. |

(Continued)

FOREIGN PATENT DOCUMENTS

DE 3904544 A 8/1990

(Continued)

OTHER PUBLICATIONS

Almulla et al., *Desalination*, 153 (2002), pp. 237-243.

(Continued)

*Primary Examiner*—Ana Fortuna

(57) ABSTRACT

A porous polymeric membrane formed from a blend of a polymeric membrane forming material, such as polyvinylidene fluoride or polysulfone and a polymeric reactivity modifying agent adapted to modify the surface active properties of the porous polymeric membrane. The reactivity modifying agent is preferably a linear polymeric anhydride, such as poly(alkyl vinyl ether/maleic anhydride). The surface activity modifications include modification of the hydrophilicity/hydrophobicity balance of the membrane, or hydrolysis followed by reaction with a polyamine to form a crosslinked polyamide layer. Such modified membranes have use as reverse osmosis membranes.

42 Claims, No Drawings

U.S. PATENT DOCUMENTS

| | | | |
|---|---|---|---|
| 4,816,160 A | 3/1989 | Ford et al. | |
| 4,846,970 A | 7/1989 | Bertelsen et al. | |
| 4,876,006 A | 10/1989 | Ohkubo et al. | |
| 4,876,012 A | 10/1989 | Kopp et al. | |
| 4,888,115 A * | 12/1989 | Marinaccio et al. | 210/636 |
| 4,921,610 A | 5/1990 | Ford et al. | |
| 4,931,186 A | 6/1990 | Ford et al. | |
| 4,935,143 A | 6/1990 | Kopp et al. | |
| 4,999,038 A | 3/1991 | Lundberg | |
| 5,005,430 A | 4/1991 | Kibler et al. | |
| 5,024,762 A | 6/1991 | Ford et al. | |
| 5,066,375 A | 11/1991 | Parsi et al. | |
| 5,066,401 A * | 11/1991 | Muller et al. | 210/500.35 |
| 5,066,402 A | 11/1991 | Anselme et al. | |
| 5,069,065 A | 12/1991 | Sprunt et al. | |
| 5,076,925 A | 12/1991 | Roesink et al. | |
| 5,079,272 A | 1/1992 | Allegrezza, Jr. et al. | |
| 5,094,750 A | 3/1992 | Kopp et al. | |
| 5,104,546 A | 4/1992 | Filson et al. | |
| H1045 H | 5/1992 | Wilson | |
| 5,137,631 A | 8/1992 | Eckman et al. | |
| 5,138,870 A | 8/1992 | Lyssy | |
| 5,147,553 A | 9/1992 | Waite | 210/654 |
| 5,151,191 A | 9/1992 | Sunaoka et al. | |
| 5,151,193 A | 9/1992 | Grobe et al. | |
| 5,158,721 A | 10/1992 | Allegrezza, Jr. et al. | |
| 5,192,456 A | 3/1993 | Ishida et al. | |
| 5,194,149 A | 3/1993 | Selbie et al. | |
| 5,198,116 A | 3/1993 | Comstock et al. | |
| 5,209,852 A | 5/1993 | Sunaoka et al. | |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,248,424 A | 9/1993 | Cote et al. | |
| 5,297,420 A | 3/1994 | Gilliland et al. | |
| 5,320,760 A | 6/1994 | Freund et al. | |
| 5,353,630 A | 10/1994 | Soda et al. | |
| 5,361,625 A | 11/1994 | Ylvisaker | |
| 5,364,527 A | 11/1994 | Zimmermann et al. | |
| 5,389,260 A | 2/1995 | Hemp et al. | |
| 5,401,401 A | 3/1995 | Hickok et al. | |
| 5,403,479 A | 4/1995 | Smith et al. | |
| 5,405,528 A | 4/1995 | Selbie et al. | |
| 5,417,101 A | 5/1995 | Weich | |
| 5,419,816 A | 5/1995 | Sampson et al. | |
| 5,470,469 A | 11/1995 | Eckman | |
| 5,477,731 A | 12/1995 | Mouton | |
| 3,228,876 A | 1/1996 | Mahon | |
| 5,480,553 A | 1/1996 | Yamamori et al. | |
| 5,531,848 A | 7/1996 | Brinda et al. | |
| 5,531,900 A | 7/1996 | Raghavan et al. | |
| 5,543,002 A | 8/1996 | Brinda et al. | |
| 5,554,283 A | 9/1996 | Brinda et al. | |
| 5,607,593 A | 3/1997 | Cote et al. | |
| 5,639,373 A | 6/1997 | Mahendran et al. | |
| 5,643,455 A | 7/1997 | Kopp et al. | |
| 5,747,605 A | 5/1998 | Breant et al. | 525/437 |
| D396,046 S | 7/1998 | Scheel et al. | |
| 5,783,083 A | 7/1998 | Henshaw et al. | |
| D396,726 S | 8/1998 | Sadr et al. | |
| D400,890 S | 11/1998 | Gambardella | |
| 5,906,742 A * | 5/1999 | Wang et al. | 210/500.41 |
| 5,910,250 A | 6/1999 | Mahendran et al. | |
| 5,914,039 A | 6/1999 | Mahendran et al. | |
| 5,918,264 A | 6/1999 | Drummond et al. | |
| 5,942,113 A | 8/1999 | Morimura | |
| 5,944,997 A | 8/1999 | Pedersen et al. | |
| 6,024,872 A | 2/2000 | Mahendran et al. | |
| 6,039,872 A | 3/2000 | Wu et al. | |
| 6,042,677 A | 3/2000 | Mahendran et al. | |
| 6,045,899 A * | 4/2000 | Wang et al. | 428/315.7 |
| 6,048,454 A | 4/2000 | Jenkins | |
| 6,066,401 A * | 5/2000 | Stilburn | 428/432 |
| 6,074,718 A * | 6/2000 | Puglia et al. | 428/36.5 |
| 6,077,435 A | 6/2000 | Beck et al. | |
| 6,083,393 A | 7/2000 | Wu et al. | |
| 6,146,747 A * | 11/2000 | Wang et al. | 428/310.5 |
| 6,156,200 A | 12/2000 | Zha et al. | |
| 6,159,373 A | 12/2000 | Beck et al. | |
| 6,193,890 B1 | 2/2001 | Pedersen et al. | |
| 6,202,475 B1 | 3/2001 | Selbie et al. | |
| 6,254,773 B1 | 7/2001 | Biltoft | |
| 6,294,039 B1 | 9/2001 | Mahendran et al. | |
| 6,337,018 B1 | 1/2002 | Mickols | 210/500.38 |
| RE37,549 E | 2/2002 | Mahendran et al. | |
| 6,354,444 B1 | 3/2002 | Mahendran et al. | |
| 6,440,303 B2 | 8/2002 | Spriegel | |
| D462,699 S | 9/2002 | Johnson et al. | |
| 6,524,481 B2 | 2/2003 | Zha et al. | |
| 6,555,005 B1 | 4/2003 | Zha et al. | |
| 6,884,350 B2 * | 4/2005 | Muller | 210/500.36 |
| 6,890,435 B2 * | 5/2005 | Ji et al. | 210/500.23 |
| 6,994,867 B1 * | 2/2006 | Hossainy et al. | 424/423 |
| 2002/0078865 A1 | 6/2002 | Salman | |
| 2002/0079246 A1 | 6/2002 | Ling | |
| 2002/0117419 A1 | 8/2002 | Tippey | |
| 2002/0125171 A1 | 9/2002 | Kuske | |
| 2002/0148767 A1 | 10/2002 | Johnson et al. | |
| 2002/0153299 A1 | 10/2002 | Mahendran et al. | |
| 2002/0170275 A1 | 11/2002 | Salman | |
| 2002/0195390 A1 | 12/2002 | Zha et al. | |
| 2003/0065302 A1 | 4/2003 | Kuroda | |
| 2003/0073970 A1 | 4/2003 | Suga | |
| 2003/0075504 A1 | 4/2003 | Zha et al. | |
| 2004/0085300 A1 | 4/2003 | Suga | |
| 2003/0089659 A1 | 5/2003 | Zha et al. | |
| 2003/0136746 A1 | 7/2003 | Behman et al. | |
| 2003/0178365 A1 | 9/2003 | Zha et al. | |
| 2003/0205519 A1 | 11/2003 | Zha et al. | |
| 2003/0226797 A1 | 12/2003 | Phelps | |
| 2003/0234221 A1 | 12/2003 | Johnson et al. | |
| 2004/0000520 A1 | 1/2004 | Gallagher et al. | |
| 2004/0035782 A1 | 2/2004 | Muller | |
| 2004/0092901 A1 | 5/2004 | Recca | |
| 2004/0159858 A1 | 8/2004 | McLaughlin | |
| 2004/0167490 A1 | 8/2004 | Nelson | |
| 2004/0167493 A1 | 8/2004 | Jarpenberg | |
| 2004/0187489 A1 | 8/2004 | Kellenberger | |
| 2004/0168947 A1 | 9/2004 | McDonald | |
| 2004/0172002 A1 | 9/2004 | Nelson | |
| 2004/0173490 A1 | 9/2004 | Otaubo | |
| 2004/0176735 A1 | 9/2004 | Snell | |
| 2005/0015052 A1 | 1/2005 | Klippen | |

FOREIGN PATENT DOCUMENTS

| | | |
|---|---|---|
| DE | 4117281 A | 1/1992 |
| DE | 4117422 A | 11/1992 |
| EP | 50447 A1 | 10/1985 |
| EP | 250337 A1 | 12/1987 |
| EP | 407900 A2 | 1/1991 |
| EP | 395133 A1 | 2/1995 |
| EP | 463627 A2 | 5/1995 |
| EP | 430082 A2 | 6/1996 |
| EP | 763758 A1 | 10/1996 |
| EP | 911073 A1 | 4/1999 |
| EP | 1052012 A1 | 11/2000 |
| FR | 2620712 A1 | 3/1989 |
| FR | 267448 A1 | 2/1992 |
| GB | 2253572 A | 9/1992 |
| JP | 58-088007 A2 | 5/1983 |
| JP | 61-097006 A2 | 5/1986 |
| JP | 61-107905 A2 | 5/1986 |
| JP | 61-257203 A2 | 11/1986 |

| | | | | | | |
|---|---|---|---|---|---|---|
| JP | 61-263605 A2 | 11/1986 | | JP | 08-010585 A2 | 1/1996 |
| JP | 62-004408 A2 | 1/1987 | | JP | 09-141063 A2 | 6/1997 |
| JP | 62-114609 A2 | 5/1987 | | JP | 10-156149 A2 | 6/1998 |
| JP | 62-140607 A2 | 6/1987 | | WO | WO 89/00037 | 1/1989 |
| JP | 62-179540 A2 | 8/1987 | | WO | WO 90/00434 | 1/1990 |
| JP | 63-097634 A2 | 4/1988 | | WO | WO 90/01311 | 2/1990 |
| JP | 01 307409 A2 | 12/1989 | | WO | WO 95/32698 | 12/1995 |
| JP | 02-144132 A2 | 6/1990 | | WO | WO 96/41676 | 12/1996 |
| JP | 02-164423 A2 | 6/1990 | | WO | WO 96/41753 | 12/1996 |
| JP | 02-284035 A2 | 11/1990 | | WO | WO 97/33815 | 9/1997 |
| JP | 03-018373 A2 | 1/1991 | | WO | WO 98/57675 | 12/1998 |
| JP | 03-028797 A2 | 2/1991 | | WO | WO 99/01207 A1 | 1/1999 |
| JP | 03-110445 A2 | 5/1991 | | WO | WO 99/59707 * | 11/1999 |
| JP | 04-310223 A2 | 11/1992 | | | | |
| JP | 05-023557 A2 | 2/1993 | | | | |
| JP | 05-157654 A2 | 6/1993 | | | | |
| JP | 06-071120 A2 | 3/1994 | | | | |
| JP | 06-114240 A2 | 4/1994 | | | | |
| JP | 07-000770 A2 | 1/1995 | | | | |
| JP | 07-275665 A2 | 10/1995 | | | | |

OTHER PUBLICATIONS

Rosenberger et al., *Desalination*, 151 (2002), pp. 195-200.

PCT International Search Report for PCT/AU01/01450, Mar. 12, 2001.

* cited by examiner

MODIFIED MEMBRANES

RELATED APPLICATIONS

This application is a divisional of U.S. application Ser. No. 10/437,202, filed on May 12, 2003 now U.S. Pat. No. 6,884,350, which is a continuation, under 35 U.S.C. § 120, of International Patent Application No. PCT/AU01/01450, filed on Nov. 9, 2001 under the Patent Cooperation Treaty (PCT), which was published by the International Bureau in English on May 16, 2002, which designates the U.S. and claims the benefit of Australian Provisional Patent Application No. PR 1434, filed Nov. 13, 2000.

TECHNICAL FIELD

The invention relates to porous membranes which have modified physical properties imparted by the addition of chemical modifiers.

BACKGROUND OF THE INVENTION

Synthetic membranes are used for a variety of applications including desalination, gas separation, filtration and dialysis. The properties of the membranes vary depending on the morphology of the membrane ie properties such as symmetry, pore shape and pore size and the polymeric material used to form the membrane.

Different membranes can be used for specific separation processes, including microfiltration, ultrafiltration and reverse osmosis. Microfiltration and ultrafiltration are pressure driven processes and are distinguished by the size of the particle or molecule that the membrane is capable of retaining or passing. Microfiltration can remove very fine colloidal particles in the micrometer and submicrometer range. As a general rule, microfiltration can filter particles down to 0.1 µm, whereas ultrafiltration can pass through particles as small as 0.01 µm. Reverse Osmosis operates on an even smaller scale.

As the size of the particles to be separated increases so too does the pressure required to carry out the separation and the density of the membrane.

A large surface area is needed when a large flux is required. One known technique to make filtration apparatus more compact is to form membranes in the shape of a hollow porous fiber. Modules of such fibres can be made with an extremely large surface area per unit of volume.

Microporous synthetic membranes are particularly suitable for use in hollow fibres and they are produced by phase inversion. In this process, a polymer is dissolved in an appropriate solvent and a suitable viscosity of the solution is achieved. The polymer solution can then be cast as a film or hollow fiber, and then immersed in a precipitation bath such as water. This causes separation of the homogeneous polymer solution into a solid polymer and liquid solvent phase. The precipitated polymer forms a porous structure containing a network of uniform pores. Production parameters that affect the membrane structure and properties include the polymer concentration, the precipitation media and temperature and the amount of solvent and non-solvent in the polymer solution. These factors can be varied to produce microporous membranes with a large range of pore sizes (from less than 0.1 to 20 µm), and altering chemical, thermal and mechanical properties.

Microporous phase inversion membranes are particularly well suited to the application of removal of viruses and bacteria. Of all types of membranes, the hollow fiber contains the largest membrane area per unit volume.

Different techniques can be used to induce phase separation and prepare polymer membranes. A polymer dissolved in a solvent can solidify upon cooling, which is known as liquid-solid phase separation. Phase separation can be induced either by a temperature change or by a change in the concentration of the solution. These two processes are referred to as thermally induced phase separation (TIPS) and diffusion induced phase separation (DIPS). The morphology induced by phase separation needs to be secured and hence solidification of the polymer phase needs to be achieved. In the TIPS process this is usually done by dropping the temperature below the g transition temperature or the melting point of the polymer. The DIPS process uses a change in concentration, caused by diffusion of a solvent and a non-solvent, to induce a phase separation. With this technique, the hollow fiber membranes are produced using a batchwise process. The DIPS process has an advantage that asymmetric membranes can easily be formed. In addition, the spinning of hollow fibers can be performed at room temperature, whereas the alternative process—thermally induced phase separation (TIPS) requires much higher temperatures. Since DIPS uses the diffusion of non-solvent and solvent it is relatively easy to control the rate at which membrane formation takes place by changing the concentration of the non-solvent bath and the polymer solution. The disadvantage however, is that macrovoids can be produced, in the form of fingerlike intrusions in the membrane. They decrease the mechanical strength of the membrane but can be avoided by choosing the right composition of solution.

Flat sheet membranes are prepared in the following way. A polymer solution consisting of a polymer and solvent is brought into contact with a non-solvent. The solvent diffuses outwards into the coagulation bath and the non-solvent will diffuse into the cast film. After a given period of time, the exchange of the non-solvent and solvent has proceeded such that the solution becomes thermodynamically unstable and demixing occurs. Finally a flat sheet is obtained with an asymmetric or symmetric structure Hydrophobic surfaces are defined as "water hating" and hydrophilic surfaces as "water loving". Many of the polymers that porous membranes are made of are hydrophobic. Water can be forced through a hydrophobic membrane by use of sufficient pressure, but the pressure needed is very high (150-300 psi), and the membrane may be damaged at such pressures and generally does not become wetted evenly.

Hydrophobic microporous membranes are characterised by their excellent chemical resistance, biocompatibility, mechanical strength and separation performance. Thus, in the application of water filtration, such hydrophobic membranes need to be hydrophilised to allow water to permeate them. Many hydrophilic materials are not suitable for MF and UF membranes that require mechanical strength and thermal stability since water molecules play the role of plasticizers.

Currently, poly(tetrafluoroethylene) Wipe), Polyethylene (PE), Polypropylene (PP) and polyvinylidene fluoride (PVDF) are the most popular and available hydrophobic membrane materials. Polyvinylidene fluoride (PVDF) is a semi-crystalline polymer containing a crystalline phase and an amorphous phase. The crystalline phase provides good thermal stability whilst the amorphous phase has flexibility towards membranes. PVDF, exhibits a number of desirable characteristics for membrane applications, including thermal resistance, chemical resistance (to a range of corrosive chemicals, including chlorine), and weather (UV) resistance Modification of a polymer's surface potentially can maintain a polymer's desirable bulk properties but can provide new, different interfacial properties. Membranes made from hydrophilic polymers are generally less prone to fouling thane hydrophobic polymers. In some instances, surface modification of the more chemically resistant polymers has rendered them less susceptible to fouling. Numerous techniques exist for the surface modification of polymers. The most common examples of this chemistry are reactions that introduce a single type of functional group or mixture of functional groups.

In general, all techniques of hydrophilisation of polymer surfaces involve an increase of the surface amount of polar groups. From a microscopic point of view, the basis of surface hydrophilisation is to maximise hydration and hydrogen bonding interactions. All sorts of oxygen, nitrogen or sulfur containing organic functional groups can interact with water more effectively than common carbon based repeating units. There are various methods for wetting a membrane on a non-permanent basis. One method of hydrophilising a porous hydrophobic membrane has been to pass alcohol through the pores of the membrane, then replace the alcohol by water. Surfactants and a post treatment with a glycerol coating have also been used. This is an adequate solution to the problem, so long as the water remains in the pores. However, if the water is removed from the pores either wholly or partially, and they are filled with air, the hydrophilised membrane is rendered hydrophobic again, and water cannot pass through the pores if it is not subjected to high pressure.

It is an object of the present invention to overcome or ameliorate at least one of the disadvantages of the prior art, or to provide a useful alternative.

SUMMARY OF THE INVENTION

According to a first aspect the invention provides a porous polymeric membrane formed from a blend of a polymeric membrane forming material and an anhydride as a reactivity modifying agent adapted to modify the surface active properties of the porous polymeric membrane relative to a porous polymeric membrane formed from the polymeric membrane forming material alone.

The term "blend" as used herein refers to an intimate mixture or alloy of the polymeric membrane forming material and polymeric reactivity modified agent which requires that the two components be compatible, ie miscible, with one another.

Preferably, the polymeric membrane forming material is of low reactivity relative to the reactivity mowing agent. The polymeric membrane forming material may in some cases desirably be inert.

Preferably, the polymeric membrane forming material is PVDF, especially hydrophobic PVDF.

In alternative preferred embodiments, the polymeric membrane forming material is polysulfone. The term polysulfone is used herein in the broad sense in which it is understood by those skilled in the art, and is intended to encompass polysulfone per se, as well as the polyether sulfones, polyaryl sulfones (in particular, polyphenyl sulfone), polyalkyl sulfones, polyaralkyl sulfones and the like.

According to a second aspect, the invention provides a method of preparing a porous polymeric membrane wherein an anhydride as a reactivity modifying agent is blended in the surface active porous polymeric membrane by incorporation into the bulk material By reactivity modifying agent, it will be understood to include, but not limited to, the overall behaviour of the membrane and/or the membrane surface to chemical species. In addition to reactivity, the membrane may be modified with respect to other properties. For instance, a particularly preferred reactivity to be modified is the hydrophilicity/hydrophobicity and/or the surface charge of the membrane.

Preferably, the reactivity modifying agent is a polymeric reactivity modifying agent, in particular a linear polymeric anhydride. Most preferably the polymeric reactivity modifying agent is Gantrez™.

In a first embodiment, the reactivity modifying agent is included ins the surface active porous polymeric membrane by incorporation into the bulk material, for example, by combining with the polymeric membrane foxing material prior to or during membrane formation. In particular, the reactivity modifying agent is added to the polymer dope mixture before the membrane is cast.

The reactivity modifying agent may be incorporated into the membrane in a reacted or unreacted form. The reactivity modifying agent incorporated into the polymeric porous membrane may be subjected to chemical modification subsequent to incorporation into the membrane. One preferred chemical modification is hydrolysis to render the membrane hydrophilic. Other preferred chemical modifications include cross linking. In a highly preferred form of the invention, the Gantrez™ is included in the membrane during formation and the resultant Gantrez™ modified membrane is then subjected to crosslinking or an additional treatment which modifies reactivity, such as treatment with one or more of tetraethylenepentamine (TEP), tris-(hydroxymethyl) aminomethane (TRIS), sulfuric acid ($H_2SO_4$), polyethylene glycol (PEG), calcium carbonate ($CaCO_3$).

Membranes containing reactive surface groups, such as acid or anhydride groups resulting from the incorporation of Gantrez can be crosslinked with crosslinking amines to form amide linkages. The degree of incorporation and extent of crosslinking can be used to construct a membrane suitable for reverse osmosis operations. In this way, polymeric reactivity modify agents such as Gantrez can form porous polymeric microfiltraton or ultrafiltration membranes which act as substrates for reverse osmosis membranes.

When the reactivity modifying agent is incorporated into the polymeric membrane forming material before or during membrane formation, it is preferably adapted to combine with the membrane forming material in an amount such that the combined precursor to the surface active porous polymeric membrane acts as a single phase mixture. The membrane may then preferably be prepared by known methods in the art. Most preferably, it is formed into a hollow fibre membrane or a flat sheet membrane.

According to a third aspect, the invention also provides a method of modifying the surface of a porous polymer membrane including:
i) blending an anhydride as a reactivity mowing agent with a polymeric membrane forming material and
ii) forming a modified membrane.

The invention also provides an agent for forming a modified membrane in accordance with the preceding aspects.

According to a fourth aspect the invention provides a blend of a membrane forming polymer and a compatible second polymer, said second polymer being capable of chemical modification after membrane formation.

Preferably, the compatible second polymer is compatible with PVDF, or polysulfone, or more preferably, both The commercial copolymer Gantrez™, or poly(methyl vinyl ether/maleic anhydride), is a linear polymeric anhydride which is available in several molecular weight ranges.

Due to the reactive anhydride sites in the Gantrez™ structure and the extensive chemistry associated with this, Gantrez™ can not only provide the appropriate hydrophilicity to the polymer fibers but may provide numerous possibilities for tailoring the fiber to specific applications, depending on the chemistry involved.

In one embodiment of the invention, Gantrez™ was added to the polymer dope mixture and both flat sheet and hollow fiber membranes were produced from this. The primary tests carried out on the flat sheet membranes constituted the initial experimentation, and involved quantifying the dyes absorbed after post-treatment of the membranes.

The hollow fiber membranes produced were tested for tensile strength, permeability, microscopic structure and the change in glass transition temperature of the modified membrane.

Gantrez™ is a commercial ingredient. Its properties and diversity both in the hydrolysed and non-hydrolysed forms are known. Gantrez™ allows membranes to be fabricated which have excess anhydride sites, and by adding various amines and bases for example, the essential mechanical properties of the membranes can be preserved, yet hydrophilicity (and hence flow through the porous membrane) and reaction with other materials can be improved. There can also be a resultant decrease in fouling of the membrane, since say for instance there was a slight negative charge on the fiber then more particles would stay in suspended in solution.

Gantrez™ or poly(methyl vinyl ether/maleic anhydride) is a water soluble copolymer which has the following structure:

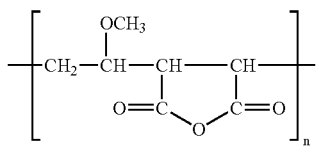

Gantrez™ is a linear polymeric anhydride, which is the interpolymer of methyl vinyl ether and maleic anhydride. Gantrez™ is manufactured by International Specialty Products (ISP) and is available in a range of molecular weights. The physical and chemical properties of some preferred forms of Gantrez™ are listed below:

| Appearance: | white, fluffy powder |
|---|---|
| Softening point range | 200-225° C. |

Molecular Weights, Specific Viscosity and Glass Transition Temperature:

| | $M_w$ | $M_N$ | Viscosity | $T_g$ (° C.) |
|---|---|---|---|---|
| Gantrez ™ AN 119 | $2.13 \times 10^5$ | $6.19 \times 10^4$ | 0.1-0.5 | 152 |
| Gantrez ™ AN 139 | $8.72 \times 10^5$ | $2.21 \times 10^5$ | 1.0-1.5 | 151 |
| Gantrez ™ AN 149 | $1.25 \times 10^6$ | $3.53 \times 10^5$ | 1.5-2.5 | 153 |
| Gantrez ™ AN 169 | $1.89 \times 10^6$ | $5.78 \times 10^5$ | 2.6-3.5 | 154 |

Poly(methyl vinyl ether/maleic anhydride) having a molecular weight in the range $5 \times 10^4$ to $5 \times 10^7$ may also be used. The molecular weights were determined by size exclusion chromatography, the specific viscosity carried out at 25° C. in a 1% MEK solution in a capillary viscometer.

The two monomer types in Gantrez™ individually contribute properties to make the copolymer highly valued material in a variety of applications. The poly(methyl vinyl ether) is a flexible film former while the maleic anhydride is a hard polar monomer which contributes to bonding strength.

The reaction of maleic anhydride and methyl vinyl ether is as follows:

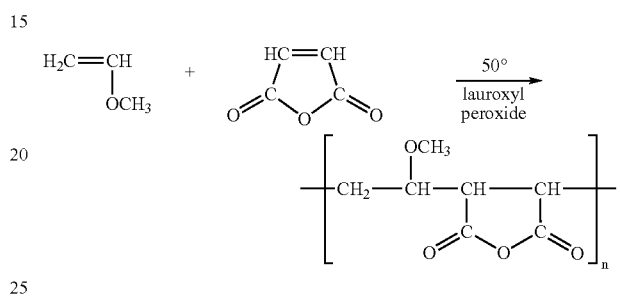

Gantrez™ is soluble in water and several organic solvents including alcohols, phenols, pyridine, aldehydes, ketones, lactams and lower aliphatic esters. It is insoluble in aliphatic, aromatic or halogenated hydrocarbons, ethyl ether and nitroparaffins.

When the copolymer dissolves in water or alcohols, the anhydride linkage is cleaved such that the formation of the polar, polymeric free acid or the corresponding partial esters occurs.

Both aqueous and organic solvent solutions of Gantrez™ form films that are tack-free and possess a high tensile and cohesive strength These films do, however, possess an inherent brittleness, so this property will have to be carefully monitored when incorporating the Gantrez™ into the membrane.

Although Gantrez™ powder is hygroscopic and will slowly hydrolyze in a humid environment, it can absorb up to 30 wt % water without effecting the flow characteristics of the powder. Mild heating (100° C. for 1-2 hours) can remove unbound water.

Several studies have been carried out in making asymmetric membranes using small molecular additives to improve membrane characteristics. Such characteristics include high permeability, good macroscopic integrity such as circular lumen, uniform wall thickness, and mechanical strength. It is known from literature that PVDF has a small critical surface tension (about 25 dynes/cm), the coagulation rate and fiber solidification are slow as a result of the weak interaction between the coagulant (water or solvent) and the polymer. As a consequence, difficulties arise when preparing porous asymmetric PVDF hollow fiber membranes without additives.

Surface Grafting in polymer chemistry is a process known in the art by which side chains of a second polymer are introduced onto an existing polymer main chain. Surface grafting generally leads to an overlayer of a second functionalized polymer covalently linked to the substrate polymer. Unlike simple functionalisation, which produces a polymer surface or interphase, grafting produces a physically distinct overlayer with properties that resemble those of the pure graft homopolymer. The methodology for grafting is based on radical polymerisations.

In Contrast to techniques where the surface composition is modified by some external treatment, in bulk modifications the surface composition is the result of the effect of the presence of another component in the polymer system.

The aim for polymer blends is to combine the properties of the single components into one material. By dissolving one polymer in another polymer so that there is an interpenetration of one polymer in another. The "polymer blend" that is synthesized in this way is not stable thermodynamically. Thermodynamic instability means that a demixing process occurs in the melt. To increase the stability it is necessary to crosslink one or both polymers.

Surprisingly, it has been found by the present applicants that Gantrez™ is miscible with polar polymers such as the polysulfones and PVDF. Normally, very few polymers are miscible with other polymers—for example, the literature reveals that there is known only one polymer, polyvinyl pyrrolidone (PVP) which is miscible (compatible) with both PVDF and polysulfone.

In the prior art, it is known to use mixtures of two polymeric membrane forming materials which are not miscible. These prior art mixtures require stabilization by cross linking, ie the two non miscible materials are stabilized by chemical reaction, and in this regard, they are not true "blends" as defined herein.

Gelation is an important consideration in membrane formation. Gelation can be defined as the formation of a three dimensional network by chemical or physical crosslinking. When gelation occurs, a dilute or more viscous polymer solution is converted into a system of infinite viscosity, that is, a gel. A gel can be considered as a highly elastic, rubberlike solid. It is important to note that gelation is not a phase separation and can occur in a homogeneous solution (that is a polymer and a solvent) as well. Experiments will have to be carefully monitored so as to avoid gelation in the polymer solution, and one of the objectives of the chemical modification of the pre-existing membranes is to optimize the amount of Gantrez™ in the polymer solution without gelation occurring.

Gelation of blends which incorporate Gantrez™ can occur if there are multivalent components in the polymer blend such as polyalcohols (in various forms such as sugars, polyvinyl alcohols, polyethylene glycols, ethylene glycol, glycerol and the like). These gelation reactions can be minimized by reducing the time the Gantrez spends in solution with the multivalent components by blending the Gantrez into the membrane forming mixture (or vice versa) immediately prior to membrane casting.

One of the most capable copolymers at binding molecules are maleic anhydride copolymers. The reactions exemplified below are just some of the many reactions that can occur.

As mentioned above, Gantrez™ undergoes hydrolysis quite readily. The hydrolysis reaction was carried out in the presence of a sodium buffer (0.5M sodium chloride+0.1M sodium borate pH=9.3). The problem with hydrolysing the Gantrez™ lies in the fact that the reactive anhydride sites will be lost when this reaction takes place. Secondly, the solvents that Gantrez™ does dissolve in will also dissolve the polymer material that makes the membrane fibers.

To overcome this problem, in the surface modification trials, the Gantrez™ is only partially hydrolysed then reacted with the polyfunctional amine, in order to crosslink Gantrez™ with the reactive amine groups. Under the appropriate conditions, the reaction of amine groups can be favoured over hydrolysis even in an aqueous medium.

A variety of methods are available for the characterisation of surfaces and permeability. One method to study adsorption or fouling onto a surface is to use radioactive labels, tagged to the appropriate molecule, however this method has proved too cumbersome. Characterisation of the modified membranes is crucial because a small change in one of the membrane production parameters can change the surface structure and consequently have a drastic effect on membrane performance. Structural membrane properties such as pore size and pore size distribution are able to determine which particles or molecules are retained and which will pass through the membrane.

The two techniques primarily used to observe vibrational spectra are infrared (IR) and Raman spectroscopy. The IR spectrum arises from the absorption of radiation, which results from transitions among the various vibrational quantum levels. Infrared testing is carried out primarily on the bulk modified polymer membranes. IR measurements are taken on a polymer solution with and without the Gantrez™ incorporated into the polymer matrix and these two results when compared. One region of interest in the investigation of Gantrez modified polymeric membranes, are the sharp amide peaks around 1700 $cm^{-1}$ wavelength.

Attenuated Total Reflectance, also known as Internal Reflection Spectroscopy is invaluable in the characterisation of surface layers. This technique relies on the intimate contact angle of a sample with the surface of a high refractive index, IR-transparent prism. The basic principles behind this technique is that infrared radiation enters the prism at an angle greater than the critical angle, and is internally reflected at the prism surfaces, but attenuated by absorptions from the sample contact layer.

Primarily, the SEM is an instrument for the examination of surfaces, and is a very convenient, simple technique for characterizing and investigating the porous structure of membranes. The resolution limit of a simple electron microscope lies in the 0.01 µm range, with more sophisticated microscopes operating at resolutions of 0.005 µm (5 nm). A clear and concise picture of the hollow fiber membrane can be obtained in terms of the surface and cross-section, and an estimation of the porosity and pore size distribution can also be obtained.

Many polymers are poor conductors of electricity, and as a result, charge rapidly builds up on the surface of the sample as the electron beam is scanned across it. The resulting field then interacts with the incident electron beam and causes image distortion. This problem can be overcome by coating the sample with a conducting layer usually gold. The gold is applied by sputtering and typical film thicknesses are 20 nm. Sputtering involves creating ions, accelerating them on a target, forming atoms or clusters which are then deposited on the membrane substrate.

The bubble point method is a reflection of the maximum pore size. It is the force needed to drive a liquid through the pores. The liquid used in this case is water, and the gas pressure at which a bubble emerges is measured. The maximum pore size can be calculated from bubble point.

Mechanical tests are often used to assess the ageing or chemical resistance of materials. The change in tensile properties of a material, are useful indicators of the degradation of a material. Testing consists of securing the test sample between two sets of grips. One set of grips is fixed and the other is attached to a moving crosshead and load-cell arrangement. Machines measure the force necessary to elongate and break the sample.

The break force is measured and reported as a tensile stress value by dividing the force obtained by the cross-sectional area:

Tensile stress (Mpa)=F/A

Where F=force (Newtons) required to break the test piece, and A=cross-section area of test piece (mm$^2$). The break force is a reflection of the strength of the polymer fiber and is obviously of high importance in determining performance of the membranes.

Break extension is the elongation measurement from the tensile machine is given by the extension in gauge length divided by the original gauge length. Break Extension is given as a percentage figure, while strain is shown as a fraction.

Tensile strain=change in length/original length=$(l_1-l_0)/l_0$

Where $l_1$=length between gauge marks (mm) and $l_0$=original gauge length (mm)

Break Extension=$(l_1-l_0)/l_0 \times 100\%$

The Break Extension is a measure of the elasticity of the polymer fiber, which can also be expressed as Young's modulus or the modulus of elasticity:

Young's modulus=Stress/strain in linear portion of stress-strain curve.

This is the ratio of the applied stress to the strain it produces in the region where strain is proportional to stress. This modulus is primarily a measure of stiffness. Obviously, as the polymer degrades, the break extension will decrease, so these two tests are excellent measures of polymer degradation.

Permeability is a primary factor in governing the performance or efficiency of a hollow fiber membrane for water filtration applications is the flow or flux through the membrane. The flux or permeation rate is defined as the volume flowing through the membrane per unit area and time. The equation that describes the flux is:

J=Q/AΔt

Where Q is the permeated amount, A is the membrane area and Δt the sampling time. The permeability is an important parameter when considering the effect that the addition of Gantrez™ has on the membrane performance.

BRIEF DESCRIPTION OF THE DRAWINGS

FIG. 1 shows the time required for complete hydrolysis of Gantrez™ as a function of temperature.

DETAILED DESCRIPTION OF THE PREFERRED EMBODIMENT

Experimental Methods

Production of Flat Sheet Membranes

A dope solution was prepared according to the following formulation:

| | |
|---|---|
| PVDF | 17.1 g (17%) |
| LiCl | 3.54 g (3.5%) |
| PVP/VA S630 | 2.73 g (2.7%) |
| Gantrez | 3.09 g (3.1%) |
| NMP | 74.3 g (73.7%) |
| | 100.76 g |

PVP/VA S630 is polyvinylpyrrolidone/vinyl acetate copolymer

NMP is N-methylpyrrolidone

All ingredients were added together and the dope solution was allowed to mix on heated rollers (50° C.) overnight. Once removed from the rollers, the mixture was left to settle (to remove any bubbles from the solution) for half a day.

The dope solution was cast onto a glass plate (which was notably hydrophilic) using a glass rod and a membrane was cast by immersing the glass plate into a precipitation bath consisting of:

45% PEG-200

45% H$_2$O

10% NMP

The membrane was immersed in the precipitation bath for 10 minutes (until the membrane was able to be "peeled off" the glass plate).

The membrane was divided into equal proportions and samples were soaked in the following post-treatment solutions until testing was carried out:

1. 3% Tetra ethylenepentamine (TEP)
2. 3% Tris(hydroxymethyl) aminomethane (TRIS)
3. 1% Sulfuric Acid (H$_2$SO$_4$)
4. 100% Polyethylene glycol (PEG)
5. 100% Calcium Carbonate (CaCO$_3$)
6. 100% Butanol A second flat sheet dope formulation was produced to observe the membrane without the additive PVP/VA S630. The following solution was made up:

| | |
|---|---|
| PVDF | 17.04 g (16.8%) |
| Gantrez ™ | 3.44 g (3.4%) |
| LiCl | 3.88 g (3.8%) |
| NMP | 77.02 g (76%) |
| | 101.38 g |

As before, the membrane was cast in a precipitation bath of PEG/H$_2$O/NMP, and samples immersed in the six solutions mentioned above. The qualitative and quantitative analysis were carried out as above and results are detailed in the next section.

Analysis of the Flat Sheet Membranes

Both qualitative and quantitative analysis was carried out on the different membranes. The qualitative analysis that was carried out involved dipping 1 cm$^2$ samples of membrane into different coloured dyes, namely Saffranin, Methyl Orange and Fuchsin. The intensity of the colours in the membranes was examined visually by taking photos of the membranes after they had been in the dye solutions for a day. The samples were then placed in water, and photos were taken of the amount of colour retained and lost by the membranes. The results are outlined in the next section.

The quantitative analysis involved the measurement of the intensity of the colour retained by the samples using a Hach Spectrophotometer.

Initially, the wavelengths of the dyes had to be calculated using a trial and error method. Because the region of wavelengths of the colours is known (for example red is between 500 and 600 nm) the exact wavelength could be calculated. The wavelength corresponding to the maximum absorbance obtained, was the optimum wavelength of the specific colour.

The calibration for the range of concentrations of colours was then carried out. A graph of set concentrations versus measured absorbances was plotted. This was subsequently used to read off the graph unknown concentrations, or to use the calibration equation to calculate unknown values.

Production of Hollow Fiber Membranes

The following dope solutions were used for the production of hollow fiber membranes: All weights are in grams.

|         | Dope 1         | Dope 2         | Dope 3         | Dope 4         |
|---------|----------------|----------------|----------------|----------------|
| PVDF    | 119.3 (17%)    | 103.76 (17.2%) | 102.49 (17%)   | 102.61 (17%)   |
| Gantrez | 21.44 (3.1%)   | 18.43 (3.1%)   |                | 18.35 (3.1%)   |
| S630    | 18.62 (2.7%)   | 16.05 (2.7%)   | 15.93 (2.65%)  | 15.66 (2.6%)   |
| LiCl    | 21.09 (3%)     | 18.02 (3.0%)   | 18.32 (3.05%)  | 18.66 (3.1%)   |
| NMP     | 520.6 (74.2%)  | 446.49 (74.1%) | 464.6 (77.3%)  | 446.61 (74.2%) |
| Total   | 701.05         | 602.75         | 601.34         | 601.89         |

The generic brand of PVDF that was used for Dopes 1-3 was Kynar 461, whereas Kynar 500 was used for dope 4, which has a higher molecular weight than Kynar 461. In the case of Dope 1 was all mixed together on heated rollers for a day and half Dopes 2-4 were mixed such that the S630 For Dopes 1 to 3 a water precipitation bath (quench) was used. Dope 4 used a solvent quench which consisted of 45% PBG-200, 45% water and 10% NW.

The following settings were used for production:

|        | Dope Pump Speed | Lumen Pump Speed | Winder pump speed |
|--------|-----------------|------------------|-------------------|
| Dope 1 | 150             | 400              | 300               |
| Dope 2 | 350             | 200              | 800               |
| Dope 3 | 350             | 200              | 800               |
| Dope 4 | 250             | 170              | 645               |

For dopes 1 and 4, as soon as the fibers came out of the quench and onto the winder, they were divided into the six post-treatment solutions outlined below and immersed until testing took place:
1. 3% Tetra ethylenepentamine (TEP)
2. 3% Tris-(hydroxymethyl) aminomethane (TRIS)
3. 1% Sulfuric Acid ($H_2SO_4$)
4. 100% Polyethylene glycol (PEG)
5. 100% Calcium Carbonate ($CaCO_3$)
6. 100% Butanol For dopes 2 and 3, the fibers were left on the winder until production was complete and then they were divided into the six different post-treatments and one stayed in the water as a reference.

Dope Formulations that were Unsuccessful

TABLE ##

| | Dope formulations that gelled. | | |
|---|---|---|---|
| | Dope 3 | Dope 4 | Dope 5 |
| PVDF | 122.14 (20.3%) | 121.49 (20.1%) | 100.56 (20%) |
| Gantrez | 18.14 (3%) | | 15.24 (3%) |
| S630 | 15.94 (2.6%) | 15.78 (2.6%) | |
| Sugar | | | |
| LiCl | 18.65 (3.1%) | 19.61 (3.2%) | 15.62 (3.1%) |
| NMP | 428.29 (71%) | 449.02 (74.1%) | 371.2 (73.9%) |
| Water | | | |
| Total | 603.16 | 605.9 | 502.62 |

Dopes 3, 4 and 5 ingredients were all mixed together on normal rollers over weekend.

Quantitive Results on Flat Sheet Membranes

Using a HACH spectrophotometer, Dope 2 formulation was used and the following results were obtained:

|         | Before samples in Methyl orange | After samples in Methyl Orange | Before samples in Saffranin | After samples in Saffranin |
|---------|---------------------------------|--------------------------------|-----------------------------|----------------------------|
| TEP     | 4.5   | 3.294 | 3.354 | 3.159 |
| TRIS    | 4.5   | 3.178 | 3.243 | 3.131 |
| PEG-200 | 3.466 | 3.193 | 3.243 | 3.289 |
| $CaCO_3$ | 4.5  | 3.275 | 3.216 | 2.582 |
| Butanol | 3.876 | 3.178 | 3.203 | 3.132 |
| $H_2SO_4$ | 3.165 | 3.224 | 3.392 | 2.943 |

Using Dope 3 formulation, the following results were obtained:

|         | Before samples in Methyl Orange | After membranes in dye | After membranes in dye with buffer tablet pH7 |
|---------|--------------------------------|------------------------|-----------------------------------------------|
| TEP     | 0.423 | 0.219 | 0.185 |
| TRIS    | 0.429 | 0.411 | 0.367 |
| PEG-200 | 0.411 | 0.390 | 0.350 |
| Butanol | 0.429 | 0.394 | 0.373 |
| $H_2SO_4$ | 0.440 | 0.139 | 0.402 |
| $CaCO_3$ | 0.427 | 0.369 | 0.362 |

Break Extension results on hollow fibre membranes

The following results are from Dope 1 formulation. All results are expressed as a percentage break extension by length.

|  | Wet | Dry |
|---|---|---|
| TEP | 32.32 ± 7.65 | 47.20 ± 4.78 |
| TRIS | 34.05 ± 7.12 | 50.13 ± 9.51 |
| PEG | 60.51 ± 8.69 | 33.62 ± 5.55 |
| $H_2SO_4$ | 22.57 ± 2.53 | 21.63 ± 1.56 |
| $CaCO_3$ | 24.19 ± 8.11 | 26.30 ± 5.11 |
| Butanol |  | 30.80 ± 6.57 |

|  | No Gantrez dope | Gantrez Dope | Kynar 500 Dope |
|---|---|---|---|
| TEP | 49.46 ± 9.54 | 23.64 ± 5.13 | 58.8 ± 6.13 |
| TRIS | 54.46 ± 10.32 | 17.18 ± 2.308 | 77.75 ± 10.78 |
| PEG | 90.25 ± 11.60 | 52.75 ± 4.158 | 123.0 ± 9.1 |
| $H_2SO_4$ | 48.28 ± 7.44 | 6.008 ± 0.868 | 47.18 ± 13.13 |
| $Na_2CO_3$ | 40.55 ± 13.93 | 18.30 ± 2.41 | 67.74 ± 9.25 |
| Butanol | 60.86 ± 6.60 | 8.338 ± 3.415 | 31.48 ± 3.77 |
| Water | 44.85 ± 8.79 | 7.385 ± 2.973 |  |

Permeability results on hollow fiber membranes

|  | Flow time @ 100 kPa | Flow time @ 400 kPa | # fibers | Length (m) | OD (mm) | LMH @ 100 kPa | LMH @ 400 kPa |
|---|---|---|---|---|---|---|---|
| TRIS | 39.3 | 15.0 | 4 | 0.6 | 0.85 | 143.005 | 374.672 |
| PEG | 36.5 | 10.4 | 4 | 0.6 | 0.85 | 153.975 | 540.393 |
| $H_2SO_4$ | 128.2 | 33.6 | 4 | 0.5 | 0.85 | 52.606 | 200.717 |
| Butanol | 116.4 | 34.3 | 4 | 0.4 | 0.85 | 72.424 | 245.776 |
| $CaCO_3$ | 53.4 | 14.6 | 4 | 0.55 | 0.85 | 114.813 | 419.931 |

LMH—Liter/square meters per hour

|  | w/o Gantrez | w Gantrez | # fibers | length (m) | OD (μm) | LMH of no Gantrez | LMH of Gantrez |
|---|---|---|---|---|---|---|---|
| TRIS | 127.4 | 379.3 | 6 | 0.45 | 1000 | 33.330 | 11.195 |
| PEG | 38.1 | 965.8 | 6 | 0.5 | 1100 | 91.187 | 3.597 |
| H2SO4 | 95.3 | 3534.1 | 6 | 0.5 | 1000 | 40.101 | 1.081 |
| Butanol | 70.7 |  | 6 | 0.5 | 1000 | 54.055 |  |
| $NaCO_3$ | 84.7 |  | 6 | 0.55 | 1000 | 41.018 |  |
| TEP | 123.9 |  | 6 | 0.55 | 1000 | 28.041 |  |
| Water | 275.7 |  | 6 | 0.5 | 1000 | 13.862 |  |

What is claimed is:

1. A method of preparing a microporous polymeric membrane comprising the steps of:
   blending a polymeric membrane forming material and a reactivity modifying agent comprising polymeric anhydride in an amount such that a combined precursor to the microporous polymeric membrane forms a single phase mixture and thereby obtaining a blended material having between 3.1% and 3.4% polymeric anhydride; and
   casting the microporous polymeric membrane from the blended material.

2. The method according to claim 1, wherein the reactivity modifying agent is blended with the polymeric membrane forming material in an unreacted form.

3. The method according to claim 1, wherein the reactivity modifying agent is blended with the polymeric membrane forming material in a reacted form.

4. The method according to claim 1, wherein the reactivity modifying agent blended with the polymeric porous membrane forming material is subjected to a chemical modification subsequent to the step of casting.

5. The method according to claim 4, wherein the chemical modification comprises hydrolysis whereby the microporous polymeric membrane is rendered hydrophilic.

6. The method according to claim 4, wherein the chemical modification comprises crosslinking.

7. The method according to claim 1, wherein the microporous polymeric membrane comprises a hollow fibre membrane.

8. The method according to claim 1, wherein the microporous polymeric membrane comprises a flat sheet membrane.

9. The method according to claim 1, wherein the microporous polymeric membrane is cast from a dope solution comprising a polymer.

10. The method according to claim 9, wherein the dope solution comprises at least one polymer selected from the group consisting of a polyvinylidene fluoride, a sulfone polymer, and a polyvinylpyrrolidone copolymer.

11. The method according to claim 10, wherein the dope solution comprises about 16.8 to about 17.2% polyvinylidene fluoride.

12. The method according to claim 10, wherein the dope solution comprises about 2.6 to about 2.7% polyvinylpyrrolidone/vinyl acetate copolymer.

13. The method according to claim 1, wherein the microporous polymeric membrane is cast from a dope solution comprising an organic solvent.

14. The method according to claim 13, wherein the organic solvent comprises N-methylpyrrolidone.

15. The method according to claim 14, wherein dope solution comprises about 73.7 to about 77.3% N-methylpyrrolidone.

16. The method according to claim 1, wherein the porous polymeric membrane is formed from a dope solution comprising a linear polymeric anhydride.

17. The method according to claim 16, wherein the linear polymeric anhydride comprises poly(methyl vinyl ether/maleic anhydride).

18. The method according to claim 17, wherein the dope solution comprises about 3.1% to about 3.4% poly(methyl vinyl ether/maleic anhydride).

19. The method according to claim 1, wherein the porous polymeric membrane is cast from a dope solution comprising a salt.

20. The method according to claim 19, wherein the salt comprises LiCl.

21. The method according to claim 20, wherein the dope solution comprises about 3.0 to about 3.8% LiCl.

22. The method according to claim 1, wherein the microporous polymeric membrane is cast from a dope solution comprising 17% polyvinylidene fluoride; 3.5% LiCl; 2.7% polyvinylpyrrolidone/vinyl acetate copolymer; 3.1% poly(methyl vinyl ether/maleic anhydride); and 73.7% N-methylpyrrolidone.

23. The method according to claim 1, wherein the microporous polymeric membrane is formed from a dope solution comprising 16.8% polyvinylidene fluoride; 3.4% poly(methyl vinyl ether/maleic anhydride); 3.8% LiCl; and 76% N-methylpyrrolidone.

24. The method according to claim 1, wherein the reactivity modifying agent and polymeric membrane forming material are selected such that a melt comprising the reactivity modifying agent and polymeric membrane forming material is thermodynamically stable and no demixing process occurs in the melt.

25. The method according to claim 1, wherein the reactivity modifying agent, polymeric membrane forming material, and reaction conditions are selected such that no gelation occurs during casting the membrane.

26. The method according to claim 1, further including a step of mixing the dope solution at about 50° C. overnight.

27. The method according to claim 26, wherein the dope solution is formed by a diffusion induced phase separation procedure in a precipitation bath comprising water.

28. The method according to claim 26, wherein the dope solution is formed by a diffusion induced phase separation procedure in a precipitation bath comprising polyethylene glycol.

29. The method according to claim 26, wherein the dope solution is formed by a diffusion induced phase separation procedure in a precipitation bath comprising N-methyl pyrrolidone.

30. The method according to claim 26, wherein the dope solution is formed by a diffusion induced phase separation procedure in a precipitation bath comprising 45% polyethylene glycol 200; 45% water; and 10% N-methylpyrrolidone.

31. A method of preparing a porous polymeric membrane, the method comprising the steps of:
blending a polymeric membrane forming material and a polymeric anhydride into a single phase blended material;
casting a porous polymeric membrane from the blended material; and
chemically modifying at least a portion of the polymeric anhydride blended into the polymeric porous membrane forming material with one or more substances selected from the group consisting of tetraethylenepentamine, tris-(hydroxymethyl) aminomethane, sulfuric acid, polyethylene glycol, and calcium carbonate.

32. The method according to claim 4, wherein the chemical modification comprises treatment with a crosslinking amine to form amide linkages.

33. A method of modifying a surface of a microporous polymer membrane comprising the steps of:
blending a reactivity modifying agent comprising a poly (methyl vinyl ether/maleic anhydride) with a polymeric membrane forming material, wherein the reactivity modifying agent is blended in an amount such that a combined precursor to the porous polymeric membrane forms a single phase mixture; and
casting the microporous membrane.

34. The method according to claim 33, further comprising the step of hydrolysing at least a surface portion of the reactivity modifying agent.

35. The method according to claim 34, wherein the step of hydrolysing occurs in the presence of a sodium buffer.

36. The method according to claim 34, wherein the surface portion of the reactivity modifying agent is partially hydrolysed.

37. The method according to claim 33, further comprising the steps of first at least partially hydrolysing at least a surface portion of the reactivity modifying agent, and subsequently reacting resultant hydrolysed groups with a polyfunctional amine.

38. The method according to claim 37, wherein the polyfunctional amine reacts to crosslink the resultant hydrolysed groups.

39. A method of preparing a microporous polymeric membrane, comprising acts of:
blending poly(methyl vinyl ether/maleic anhydride) and a polysulfone in an amount such that a combined precursor to the microporous polymeric membrane forms a single phase mixture and thereby obtaining a blended material; and
casting the microporous polymeric membrane from the blended material.

40. A method of preparing a microporous polymeric membrane, comprising acts of:
blending poly(methyl vinyl ether/maleic anhydride) and polyvinylidene fluoride in an amount such that a combined precursor to the microporous polymeric membrane forms a single phase mixture and thereby obtaining a blended material; and
casting the microporous polymeric membrane from the blended material.

41. The method of claim 40, further comprising an act of preparing a dope solution comprising the blended material and a polyvinylpyrrolidone copolymer.

42. The method of claim 40, wherein the act of blending comprises an act of adding a solvent comprising N-methylpyrrolidone to the single phase mixture.

* * * * *